(12) United States Patent
Ip et al.

(10) Patent No.: US 9,130,679 B1
(45) Date of Patent: Sep. 8, 2015

(54) POLARIZATION-SWITCHED DIFFERENTIAL TERNARY PHASE-SHIFT KEYING

(75) Inventors: Ezra Ip, Plainsboro, NJ (US); Fatih Yaman, Monmouth Junction, NJ (US); Lei Xu, Princeton, NJ (US); Ting Wang, Princeton, NJ (US); Yoshihisa Inada, Tokyo (JP); Takaaki Ogata, Tokyo (JP); Yasuhiro Aoki, Tokyo (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 604 days.

(21) Appl. No.: 13/437,502

(22) Filed: Apr. 2, 2012

Related U.S. Application Data

(60) Provisional application No. 61/490,618, filed on May 27, 2011.

(51) Int. Cl.
*H04B 10/04* (2006.01)
*H04B 10/524* (2013.01)
*H04B 10/556* (2013.01)
*H04B 10/532* (2013.01)
*H04L 27/20* (2006.01)

(52) U.S. Cl.
CPC ............ *H04B 10/524* (2013.01); *H04B 10/556* (2013.01); *H04B 10/532* (2013.01); *H04L 27/20* (2013.01)

(58) Field of Classification Search
CPC ............ H04B 10/505; H04B 10/5051; H04B 10/5053; H04B 10/5055; H04B 10/50572; H04B 10/50577; H04B 10/50593; H04B 10/50597; H04B 10/506; H04B 10/516; H04B 10/5161; H04B 10/524; H04B 10/532; H04B 10/54; H04B 10/541; H04B 10/548; H04B 10/556; H04B 10/5561; H03C 5/00; H04L 27/10; H04L 27/18; H04L 27/20
USPC .......... 398/182–201; 375/269, 279, 280, 281, 375/283, 308
See application file for complete search history.

(56) References Cited

U.S. PATENT DOCUMENTS

| | | | |
|---|---|---|---|
| 2002/0168026 A1* | 11/2002 | Khoini-Poorfard | 375/303 |
| 2005/0058462 A1* | 3/2005 | Talebpour et al. | 398/199 |
| 2005/0185968 A1* | 8/2005 | Dorrer et al. | 398/188 |
| 2009/0128378 A1* | 5/2009 | Cideciyan | 341/59 |
| 2009/0252501 A1* | 10/2009 | Eiselt et al. | 398/185 |

OTHER PUBLICATIONS

Bhandare, S., et al. "5.94-TB/S 1.49-B/S/HZ (40×2×2×40 GB/S) RZ-DQPSK Polarization-Division Multiplex C-Band Transmission Over 324KM" IEEE Photonics Technology Letters, vol. 17, No. 4. Apr. 2005. pp. 914-916.

(Continued)

*Primary Examiner* — M. R. Sedighian
(74) *Attorney, Agent, or Firm* — Joseph Kolodka (57) ABSTRACT

Methods and systems for transmission and reception of ternary phase-shift keyed data that include mapping triplets of binary bits to pairs of ternary symbols, such that three bits of data are encoded across two symbols having three-point constellations; modulating the pairs of ternary symbols onto a carrier; and transmitting the modulated carrier across a transmission medium.

8 Claims, 6 Drawing Sheets

104

(56) References Cited

OTHER PUBLICATIONS

Charlet, G., et al. "Performance Comparison of DPSK, P-DPSK, RZ-DQPSK and Coherent PDM-QPSK at 40GB/S Over a Terrestrial Link" Optical Fiber Communication Conference (OFC). Mar. 2009. (3 Pages).

Ip, E., et al. "Power Spectra of Return-To-Zero-Optical Signals" IEEE Journal of Lightwave Technology, vol. 24, No. 3. Mar. 2006. pp. 1610-1618.

Liu, X., et al. "Direct Detection of 107-GB/S Polarization-Multiplexed DQPSK With Electronic Polarization Demultiplexing" Optical Fiber Communication Conference (OFC). Feb. 2008. pp. 1-3.

Wernz, H., et. al. "112 GB/S POLMUX RZ-DQPSK With Fast Polarization Tracking Based on Interference Control" Optical Fiber Communication Conference (OFC). Mar. 2009. (3 Pages).

Xu, L., et al. "Low Crosstalk Demodulators for 42.8 GB/S WDM DPSK Systems" Optical Fiber Communication Conference (OFC). Mar. 2006. (3 Pages).

Zhang, H., et al. "Offset PDM RZ-DPSK for 40 GB/S Long-Haul Transmission" Optical Fiber Communication Conference (OFC). Mar. 2009. (3 Pages).

\* cited by examiner

POLARIZATION-SWITCHED DIFFERENTIAL TERNARY PHASE-SHIFT KEYING

RELATED APPLICATION INFORMATION

This application claims priority to provisional application Ser. No. 61/490,618, filed on May 27, 2011, incorporated herein by reference.

BACKGROUND

1. Technical Field

The present invention relates to submarine fiber optics and, in particular, to modulation techniques for effective submarine transmission.

2. Description of the Related Art

As global interne bandwidth demand continues to grow, fiber optic submarine systems will need spectrally efficient modulation formats with high sensitivity. While coherent optical systems that recover the optical electric field and enable digital compensation of transmission impairments achieve the highest spectral efficiencies, these systems have high complexity and high cost. Moreover, existing submarine links utilize inline dispersion management, which incur high nonlinearity penalties. It has been demonstrated that, at a spectral efficiency of one bit per Hz or less, coherent systems may not necessarily provide any benefit over non-coherent detection schemes such as differential detection, as carrier recovery in coherent systems is sensitive to nonlinear phase noise.

Previous optical systems have used modulation formats with four signal points (two uncoded bits) per symbol such as single-polarization differential quaternary phase-shift keying (SPDQPSK) or dual-polarization differential binary phase-shift keying (DP-DBPSK). Systems based on SP-DQPSK have generally yielded suboptimal performance in dispersion-managed systems, where fiber nonlinearity leads to greater phase distortion than either amplitude or polarization distortion.

Although DP-DBPSK has good robustness against phase distortion, it requires the demultiplexing of two polarizations at the receiver. While polarization tracking can be used, it leads to increased system complexity and potential vulnerability to rapid polarization changes over long transmission distances. It is also possible to encode information in the two polarization tributaries in such a manner that the tributaries are orthogonal to a standard DQPSK demodulator. One example is to transmit DBPSK in each fiber polarization, but offset their respective center frequencies by one quarter of the baud rate. However, this scheme broadens the signal spectrum, making the system more vulnerable to narrow optical filtering.

Dual-polarization transmission formats also suffer another problem: in systems with periodic amplification impacted by amplified spontaneous emission (ASE) noise, differential detection results in each signal polarization contributing a signal-ASE beat term, leading to a 3 dB power penalty if symbols in the two polarization tributaries are aligned in time. In practice, this penalty can be negated by filtering the unwanted signal polarization before differential detection, but this requires polarization tracking. Alternatively, one can use sufficiently narrow pulses much less than a 50% duty cycle and then offset the symbols in the two polarizations in time so that their signal-ASE beat terms do not overlap. However, this doubles the signal bandwidth.

As such, it is clear that none of the existing methods are adequate for the increasing needs of submarine transmission.

SUMMARY

A method for transmitting ternary phase-shift keyed data according to one embodiment is shown that includes mapping triplets of binary bits to pairs of ternary symbols, such that three bits of data are encoded across two symbols having three-point constellations; modulating the pairs of ternary symbols onto a carrier; and transmitting the modulated carrier across a transmission medium.

A method for receiving ternary phase-shift keyed data according to one embodiment that includes receiving a modulated carrier from a transmission medium; detecting pairs of ternary symbols in the modulated carrier; and decoding triplets of binary data from the pairs of ternary symbols, such that three bits of binary data are extracted from each pair of symbols according to a three-point constellation.

A transmitter according to one embodiment is shown that includes an encoder configured to map triplets of binary bits to pairs of ternary symbols, such that three bits of data are encoded across two symbols having three-point constellations; and a modulator configured to modulate the pairs of ternary symbols onto a carrier for transmission across a transmission medium.

A receiver according to one embodiment is shown that includes a detector configured to receive a modulated carrier from a transmission medium and to detect pairs of ternary symbols in the modulated carrier; and a decoder configured to decode triplets of binary data from the pairs of ternary symbols, such that three bits of binary data are extracted from each pair of symbols according to a three-point constellation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

It would be advantageous to have submarine transmission systems that operate at at least 40 Gb/s per wavelength in systems that have an exemplary channel spacing of around 50 GHz (0.8 b/s/Hz) over existing fiber routes based on low-dispersion optical fibers, having a reach greater than 7,200 kilometers. This represents a typical submarine system, but it should be understood that the present principles are not limited to such systems and may in fact be implemented on any appropriate transmission medium. To reduce cost, a non-coherent signal detection scheme is desired and, to improve system reliability, detection should not use polarization tracking.

Using a signal constellation with four points is more than is actually needed for 0.8 b/s/Hz transmission. Reducing the constellation size enables a system to combine the advantages of: (a) reduction in signal-ASE (amplified spontaneous emission) by transmitting only a single polarization per symbol slot; and (b) reduction in nonlinear penalty by increasing the phase separation between signal points above that of differential quaternary phase-shift keying (DQPSK).

On the other hand, it is not feasible to use a signal constellation with only two points (1 uncoded bit per symbol), as optical filtering will introduce significant intersymbol interference (ISI), which needs complicated signal processing algorithms such as maximum likelihood sequence detection (MLSD) to mitigate.

As such, the present principles employ an optical transmission scheme using a constellation with three points. Reduction in constellation size increases receiver sensitivity. As the proposed modulation format has a relatively constant power envelope and higher baud rate than two-bits-per-symbol systems, nonlinear impairments are reduced. Further reduction in nonlinearity is achieved by polarization switching between odd and even symbols and pulse chirping. Numerical simulations show that the resulting polarization-switched differential ternary-phase shift keying (PS-DTPSK) modulation format has a transmission distance of at least 7,200 km with good system margin and has superior performance compared to four-point modulation formats.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
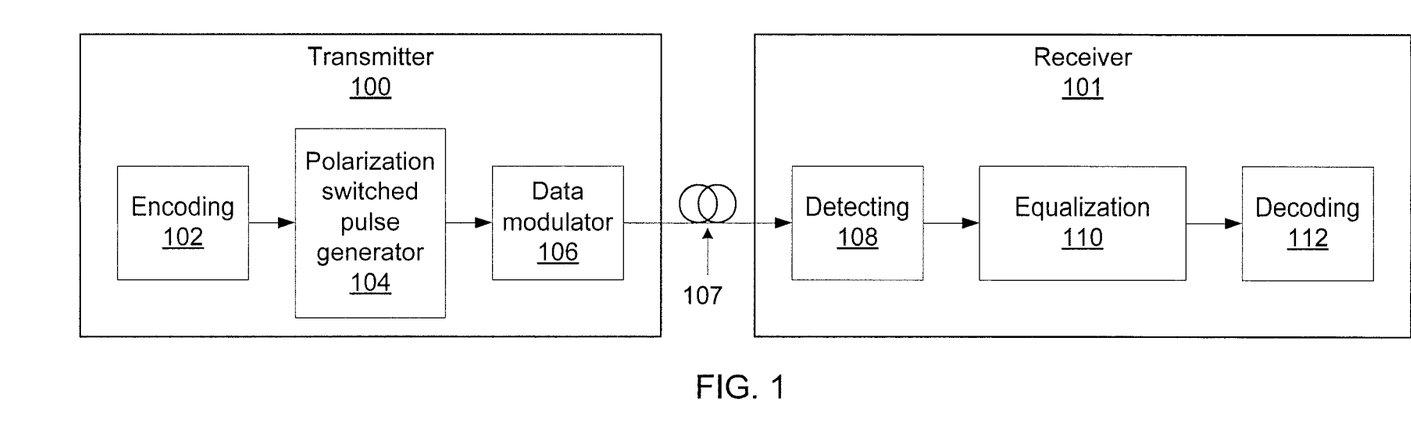
FIG. 1 is a diagram of a polarization-switched differential ternary-phase shift keying (PS-DTPSK) system according to one exemplary embodiment.

Referring now to the drawings in which like numerals represent the same or similar elements and initially to FIG. 1, an exemplary transmission/reception system is shown. A transmitter 100 communicates with a receiver 101 via a medium 107. It is specifically contemplated herein that the medium 107 may be a submarine optical fiber, but the present principles are applicable to any appropriate transmission medium. Indeed, it is contemplated that the transmission techniques described herein may be readily adapted to use in electrical and wireless media as well. The transmitter 100 includes an encoding module 102 that accepts data input and optionally encodes the data according to an appropriate forward error correction (FEC) code, such as a low-density parity check (LDPC) code.

After encoding, polarization switched pulse generator 104 generates a polarization switched optical carrier signal, and data modulator 106 modulates the data onto the optical carrier signal. It should be noted that polarization switched pulse generator 104 is optional—polarization switching improves non-linear tolerance and thereby increases the feasible transmission distance, but the present principles may alternatively be implemented on a single polarization with a differential period of two symbols, rather than the usual one signal. The modulated carrier signal is then transmitted by transmitter 100 over the medium 107, after which the signal is received by receiver 101.

Receiver 101 includes a detecting module 108 which accepts the modulated carrier signal and demodulates/decodes the symbols. Block 110 performs optional equalization that may include, for example, turbo equalization to remove interference caused by the transmission medium 107.

Figure 2:
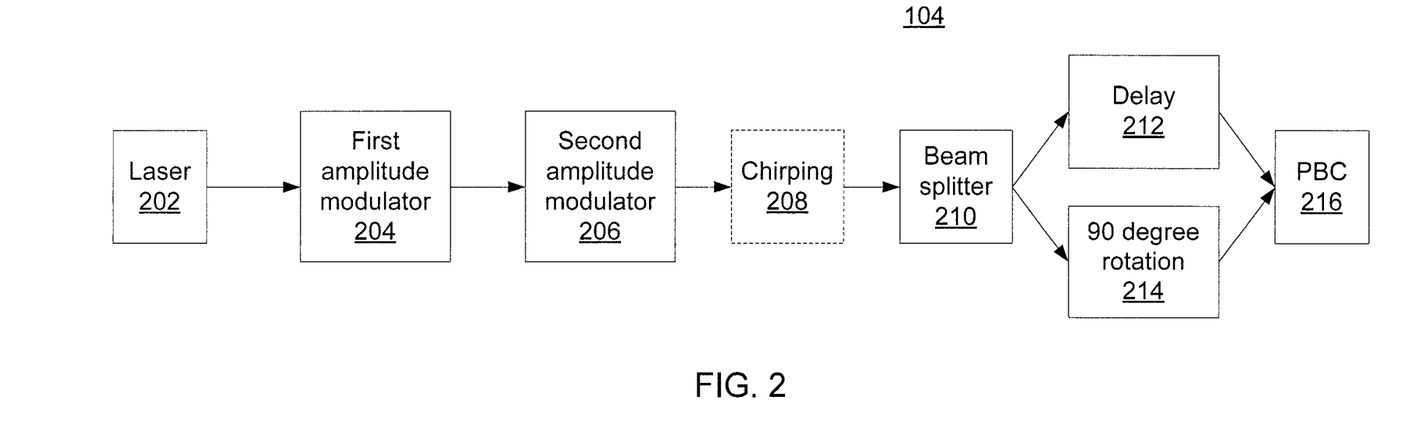
FIG. 2 is a diagram of a polarization switched pulse generator according to one exemplary embodiment.

Referring now to FIG. 2, greater detail on polarization switched pulse generator 104 is shown. A laser 202 produces a coherent carrier beam at a desired wavelength. First amplitude modulator 204 accepts the carrier beam and carves return-to-zero pulses at a given baud rate $1/T_s$, where $T_s$ is the symbol duration. The first amplitude modulator 204 may be, e.g., a single-drive Mach-Zehnder modulator (MZM) driven by, e.g., a sine wave. Depending on the amplitude and frequency of the sine wave input and the bias point of first amplitude modulator 204, 1/3, 1/2, and 2/3 return-to-zero pulses are produced.

The second amplitude modulator 206 accepts the pulsed signal and suppresses every second pulse, creating a pulse train at half the baud rate. The second amplitude modulator 206 may also be a single-drive MAM, biased at the quadrature point and driven with a square wave having an amplitude that maximizes the extinction ratio between odd and even symbol periods.

Block 208 provides optional chirping to the signal. Chirping provides amplification of the signals and can improve non-linear tolerance by broadening the signal spectrum. Chirping may be implemented according to the needs of the particular embodiment and the amplitude of the signals that is needed. Balancing the amount of system improvement against the cost of inserting an additional phase modulator for chirping, block 208 may therefore be implemented or omitted.

The signal is then split at beam splitter 210. Beam splitter 210 produces two identical beam paths, one of which is delayed at block 212 and the other of which is polarization rotated by 90° at block 214 using, e.g., birefringent material to change the beam's polarization. The two paths are then merged into a single beam at polarization beam combiner 216, which maintains the beams' respective polarizations. This produces an output beam that has pulses which alternate polarization after every symbol. Other arrangements of the pulse generator 104 may exist. For example, the order of the amplitude modulators 204 and 206 and the chirping module 208 may be interchanged. Similarly, the polarization rotator may be integrated on a single path instead of occupying separate paths. It should be understood that those having ordinary skill in the art would be able to select a particular arrangement best suited to the needs of a given application.

Figure 3:
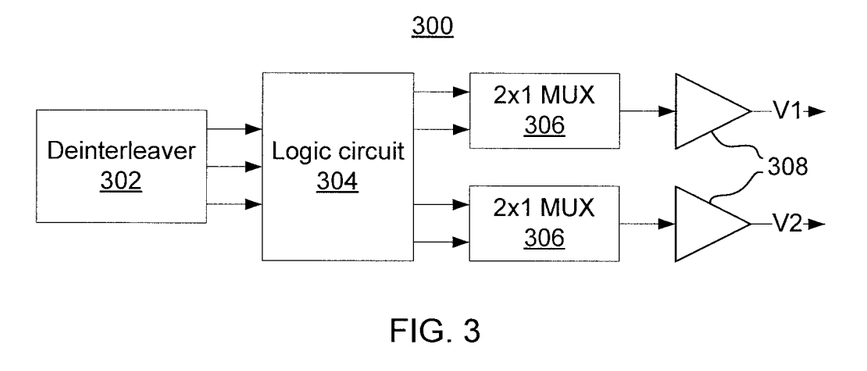
FIG. 3 is a diagram of a signal generator according to one exemplary embodiment.

Referring now to FIG. 3, greater detail on a first stage of the data modulator 106 is shown, including a drive signal generator 300. The purpose of the drive signal generator is to produce appropriate drive signal levels in two paths, V1 and V2, for an optical modulator. Since DTPSK has nine different output states over two symbol periods, up to $\log_2(9)$ bits of information can be theoretically encoded in two symbols. As such, the present principles provide for encoding three bits of information for every two symbols. At the front end of the drive signal generator 300, an incoming bitstream is deinterleaved into three parallel paths at deinterleaver 302. A logic circuit 304 produces four binary outputs corresponding to the drive signal levels for the optical modulator at odd and even symbols. The logic circuit 304 may include a rate 8/9 convolutional encoder or similar component which maps triplets of binary bits to the nine possible output states of V1 and V2. The logic circuit 304 may further include a precoder to facilitate differential detection at the receiver 101. Multiplexers 306 then combine odd and even streams, after which amplifiers 308 boost the output signals to provide the desired V1 and V2 signals.

Figure 4:
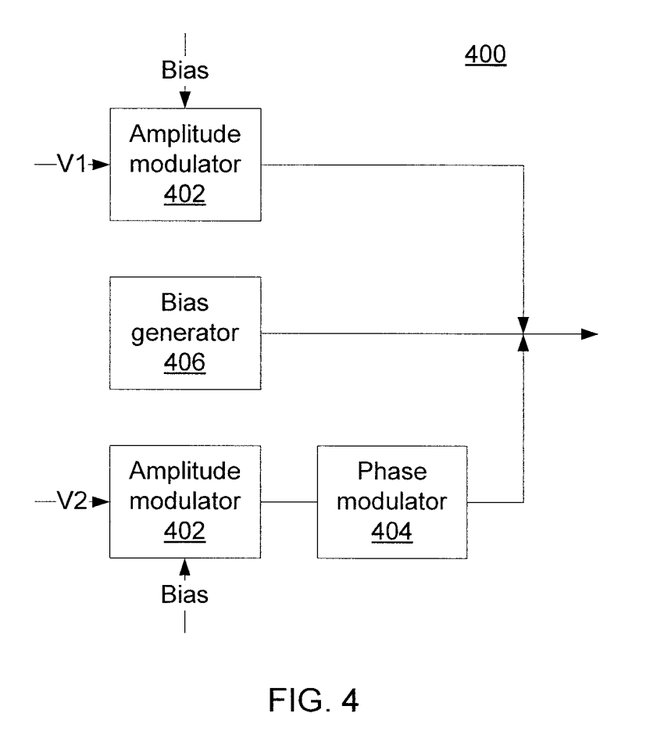
FIG. 4 is a diagram of an optical modulator according to one exemplary embodiment.

Referring now to FIG. 4, a second stage of the data modulator 106 is shown, including an optical modulator 400. The optical modulator 400 takes as input the V1 and V2 signals generated by drive signal generator 300, each following a respective path. The optical modulator 400 includes two amplitude modulators 402, each of which receives one of the respective input signals. The phase of one amplitude modulator 402 is phase shifted by sixty degrees relative to the other amplitude modulator 402 at phase modulator 402. It should be noted that this arrangement is different from a standard inphase/quadrature modulator used for quadrature-amplitude modulation, where amplitude modulators typically have a relatively phase shift of ninety degrees. Ordinarily, the vector sum of the outputs of the two amplitude modulators 402 will have four possible starts per symbol period. However, the logic circuit 304 shown in FIG. 3 guarantees that only three of the four states are used, with the unused state having a higher amplitude. The three used states have the same amplitude and have a mutual phase separation of 120 degrees.

In optical modulator 400, the amplitude modulators 402 are biased at their respective null points and their drive voltages have maximum amplitude swing to suppress the undesired effects of drive signal distortion. The vector sum of the outputs of the two amplitude modulators 402 is a ternary constellation having a net displacement relative to zero. To suppress this unwanted DC optical component, the optical modulator 400 has a third arm having a bias generator 406, which produces a signal having an amplitude and phase controlled by such bias voltages as to generate a compensating vector component. The resulting ternary constellation may then be correctly aligned.

Figure 5:
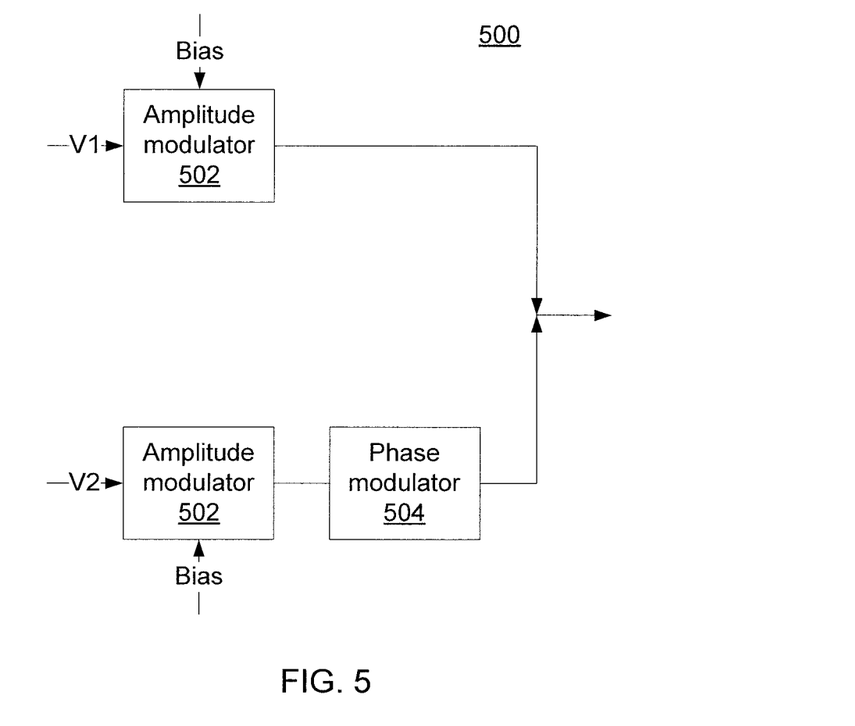
FIG. 5 is a diagram of an alternative embodiment of an optical modulator.

Referring now to FIG. 5, an alternative embodiment of an optical modulator 500 is shown. Again, two amplitude modulators 502 are phase shifted with respect to one another by sixty degrees at phase modulator 504. In this embodiment, the amplitude modulators 502 are biased away from their null points so that their vector sum adds to a correctly aligned ternary constellation. Although this architecture is simpler than that shown in FIG. 4, and can use standard dual-parallel MZMs, the generated constellation is more susceptible to drive signal distortion.

Figure 6:
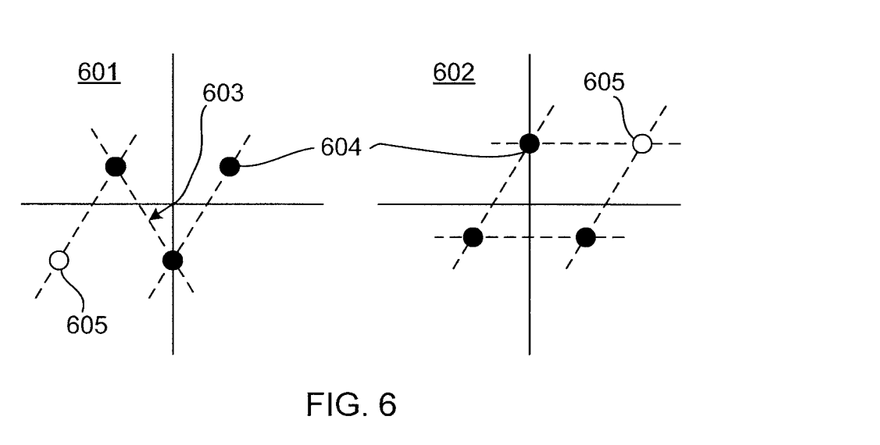
FIG. 6 is a diagram of two ternary constellations according to the present principles.

Referring now to FIG. 6, two ternary constellations are shown. The first constellation 601 is produced by optical modulator 400, where the constellation points to be used 604 are shown filled, while the unused point 605 is shown as unfilled. The bias vector 603 is shown to illustrate how the constellation is shifted by bias generator 406. Constellation 602 is produced by the optical modulator 500. In this case, the constellation is already centered and does not need to be further biased.

The use of a ternary constellation allows each symbol to take one of three possible positions. By combining two symbols, a total of nine different combinations become available for encoding data. This allows for three bits to be encoded, with one symbol extra. As such, encoding at a rate of 8/9 may be performed without transmission cost, using the additional room in the constellation to effectuate error protection.

Figure 7:
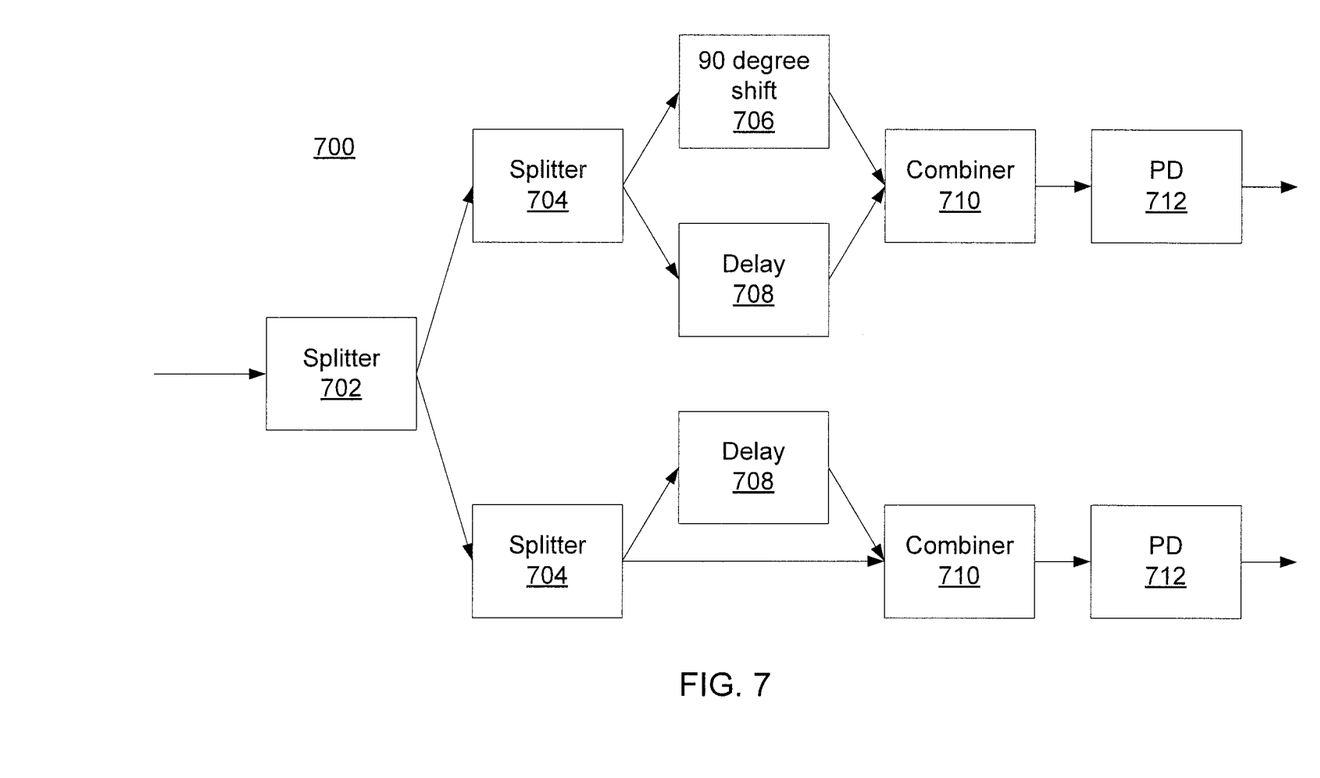
FIG. 7 is a diagram of a phase-diversity differential modulator according to one exemplary embodiment.

Referring now to FIG. 7, greater detail on a first stage of the detecting module 108 is shown, including a phase-diversity differential demodulator 700. The phase diversity differential demodulator 700 receives a signal at splitter 702 which divides the beam into two paths, representing an inphase and a quadrature path. One path uses a phase shifter 706 to produce a 90 degree phase shift in one of its branches. Each path creates an interferometer with a delay unit 708 on one of its branches that delays an incoming signal by twice the symbol rate ($2T_s$), subject to fine adjustments in length to ensure low crosstalk between inphase and quadrature outputs. The two paths then combine their respective branches at combiners 710 which are then converted to the electrical domain by photodetectors 712, where the output signals are proportional to the real and imaginary components of $E^T(t)E^*(t-2T_s)$, where $E(t)=[E_x(t),E_y(t)]^T$ is the vector representation of the optical electric field in the x- and y-polarizations. Thus, the odd and even symbols may be considered to be independent data streams, each differentially precoded by the transmitter 100 in logic circuit 304.

Figure 8:
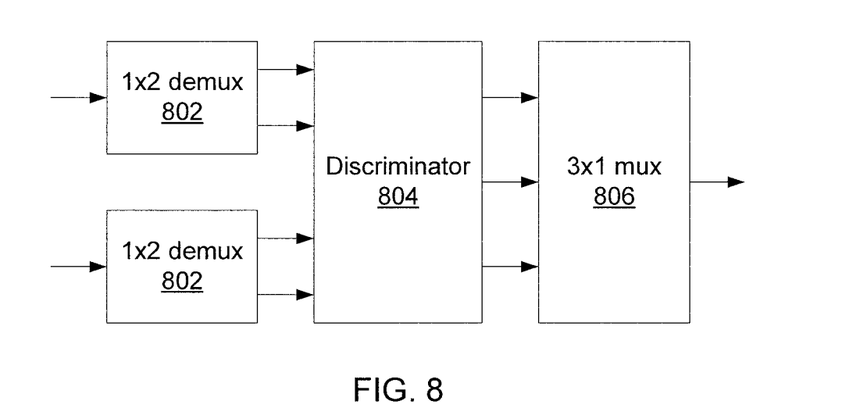
FIG. 8 is a diagram of a symbol detection circuit according to one exemplary embodiment.

Referring now to FIG. 8, a stage of the detecting module 108 is shown, including a symbol detection circuit 800. The two signal paths from phase diversity differential demodulator 700 feed into 1×2 demultiplexers 802 that split the signals into odd and even symbol paths. These paths feed into a discriminator 804 which determines which of the nine possible bit states are represented by the input optical symbol. The discriminator 804 recovers the data bits and a 3×1 multiplexer 806 forms the bits into a single bitstream. The discriminator 804 may include appropriate circuitry to decode a convolutional code having rate 8/9.

Figure 9:
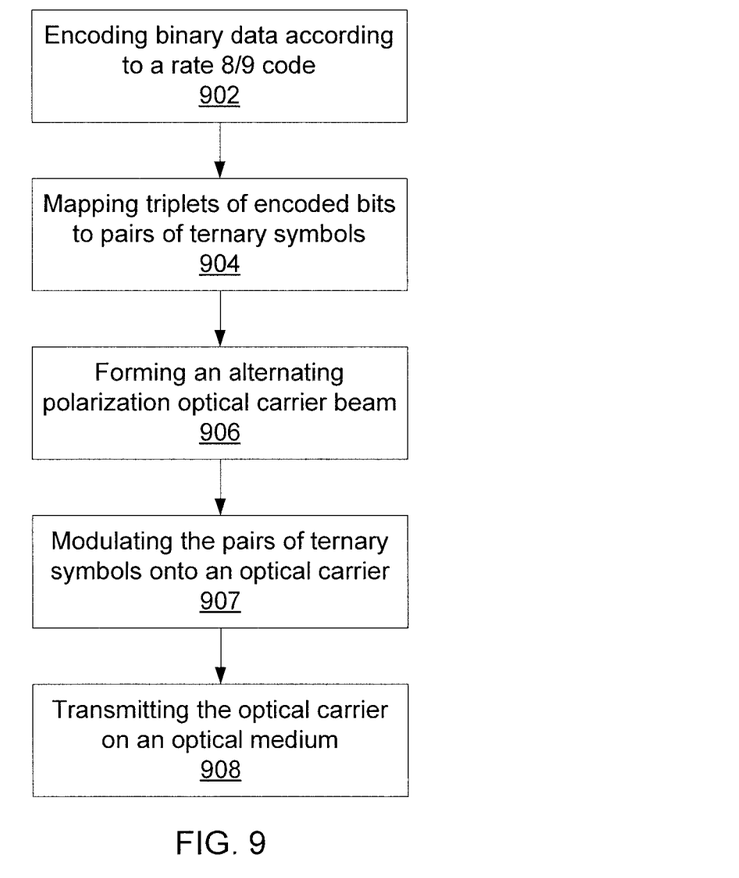
FIG. 9 is a block/flow diagram of PS-DTPSK transmission according to one exemplary embodiment.

Referring now to FIG. 9, a block/flow diagram for transmitting ternary phase-shift keyed data is illustratively shown. Block 902 encodes binary data according to an 8/9 rate code. This exploits the additional room in the ternary constellation, where eight possible bit permutations are stored in nine possible symbol configurations. Block 904 maps three encoded data bits onto the nine possible constellation configurations across pairs of ternary symbols. Block 906 forms an alternating polarization optical carrier beam by forming a series of pulses, removing every second pulse, splitting the pulses into pairs, delaying one of each pair by a symbol period, rotating the polarization of one of the pair, and recombining the pairs. This, as shown above in FIG. 2, produces a series of pulses having alternating optical polarizations. Block 907 modulates the pairs of ternary symbols onto an optical carrier using, for example, the optical modulators described above with respect to FIGS. 4 and 5. Block 908 transmits the optical carrier on an optical medium 107. As noted above, this medium is specifically contemplated as being a submarine optical fiber, but may comprise any appropriate medium.

Figure 10:
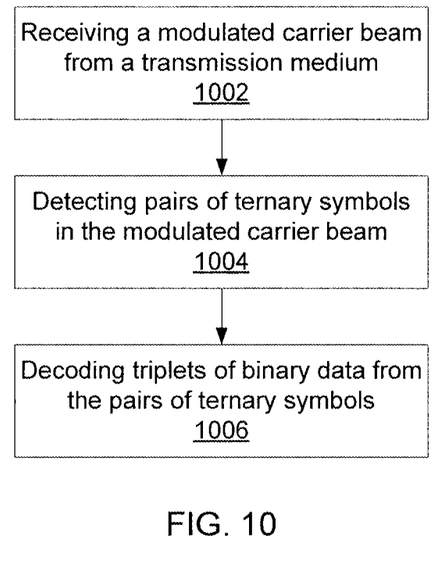
FIG. 10 is a block/flow diagram of PS-DTPSK reception according to one exemplary embodiment.

Referring now to FIG. 10, a block/flow diagram for transmitting ternary phase-shift keyed data is shown. Block 1002 receives a modulated carrier beam from medium 107. Block 1004 takes the modulated carrier beam and detects pairs of ternary symbols, which allows block 1006 to decode triplets of binary data from said pairs of symbols. This decoding may include decoding according to a rate 8/9 code. Decoding produces a bitstream formed from the decoded triplets using, for example, the symbol detection circuit shown in FIG. 8.

Having described preferred embodiments of a system and method for polarization-switched differential ternary phase shift keying (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting ternary phase-shift keyed data, the method comprising:
    mapping triplets of binary bits to pairs of ternary symbols, such that three bits of data are encoded across two symbols having three-point constellations;
    modulating the pairs of ternary symbols onto a carrier;
    transmitting the modulated carrier across a transmission medium; and
    forming an alternating polarization optical carrier beam, wherein said forming comprises:
        modulating a series of pulses onto a laser beam;
        removing every second pulse from the modulated beam;
        splitting each pulses into two;
        delaying one split pulse by one signal period;
        rotating one split pulse's polarization; and
        combining the split pulses to form a series of pulses having alternating polarization.

2. The method of claim 1, further comprising chirping the pulses.

3. The method of claim 1, further comprising encoding a binary bitstream according to a rate 8/9 code before performing said mapping.

4. A method for transmitting ternary phase-shift keyed data, the method comprising:
    mapping triplets of binary bits to pairs of ternary symbols, such that three bits of data are encoded across two symbols having three-point constellations;
    modulating the pairs of ternary symbols onto a carrier;
    transmitting the modulated carrier across a transmission medium,
    wherein modulating further comprises forming a ternary constellation by amplitude modulating two signal paths and phase modulating one of said signal paths, such that the two paths combine to form a four-point constellation having three points at a same amplitude that are centered at the origin and having one unused point at a higher amplitude than the other points.

5. A transmitter comprising:
    an encoder configured to map triplets of binary bits to pairs of ternary symbols, such that three bits of data are encoded across two symbols having three-point constellations;
    a modulator configured to modulate the pairs of ternary symbols onto a carrier for transmission across a transmission medium; and
    a polarization switched pulse generator configured to form an alternating polarization optical carrier beam,
    wherein said polarization switched pulse generator comprises:
        a first amplitude modulator configured to modulate a series of pulses onto a laser beam;
        a second amplitude modulator configured to remove every second pulse from the modulated beam;
        a beam splitter configured to split each pulse into two pulse;
        a delay module configured to delay one split pulse by one signal period;
        a polarization rotator configured to rotate one split pulse's polarization; and
        a beam combiner configured to combine the split pulses to form a series of pulses having alternating polarization.

6. The transmitter of claim 5, further comprising a chirping module configured to chirp the pulses.

7. The transmitter of claim 5, wherein the encoder is further configured to encode a binary bitstream according to a rate 8/9 code before performing said mapping.

8. A transmitter comprising:
    an encoder configured to map triplets of binary bits to pairs of ternary symbols, such that three bits of data are encoded across two symbols having three-point constellations; and
    a modulator configured to modulate the pairs of ternary symbols onto a carrier for transmission across a transmission medium,
    wherein the modulator comprises two signal paths configured to form a ternary constellation, wherein each signal path comprises an amplitude modulator and one signal path comprises a phase modulator, such that the two paths combine to form a four-point constellation having three points at a same amplitude that are centered at the origin and having one unused point at a higher amplitude than the other points.

* * * * *